US008205109B2

(12) United States Patent
Sone

(10) Patent No.: US 8,205,109 B2
(45) Date of Patent: *Jun. 19, 2012

(54) STORAGE SUBSYSTEM AND POWER SUPPLY SYSTEM

(75) Inventor: Masahiro Sone, Numadu (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/170,584

(22) Filed: Jun. 28, 2011

(65) Prior Publication Data

US 2011/0258473 A1 Oct. 20, 2011

Related U.S. Application Data

(63) Continuation of application No. 12/010,688, filed on Jan. 29, 2008, now Pat. No. 8,006,132.

(30) Foreign Application Priority Data

Jul. 24, 2007 (JP) ................................. 2007-192479

(51) Int. Cl.
*G06F 1/00* (2006.01)
(52) U.S. Cl. .......... 713/340; 713/300; 713/310; 714/14; 307/25; 307/29; 307/64; 307/65; 307/80
(58) Field of Classification Search .................. 713/300, 713/310, 340; 307/25, 28, 29, 64, 65, 80; 714/6, 14, 22
See application file for complete search history.

(56) References Cited

U.S. PATENT DOCUMENTS

| | | | | | |
|---|---|---|---|---|---|
| 5,325,363 A | * | 6/1994 | Lui | ............................... | 714/6.12 |
| 5,745,670 A | * | 4/1998 | Linde | ............................... | 714/22 |
| 5,747,889 A | * | 5/1998 | Raynham et al. | ................ | 307/80 |
| 5,881,215 A | * | 3/1999 | Alft | .................................. | 714/14 |
| 5,912,799 A | * | 6/1999 | Grouell et al. | ........... | 361/679.32 |
| 6,153,946 A | * | 11/2000 | Koch et al. | ....................... | 307/64 |

(Continued)

FOREIGN PATENT DOCUMENTS

JP 2002-214421 8/1990

(Continued)

OTHER PUBLICATIONS

International Business Machines Corporation. System Storage DS3400 Storage Subsystem. Installation, User's, and Maintenance Guide. 2008.*

(Continued)

*Primary Examiner* — Matthew D Spittle
(74) *Attorney, Agent, or Firm* — Volpe and Koenig, P.C.

(57) ABSTRACT

The present invention includes a plurality of disk units for storing data from a host computer, a plurality of power supply apparatuses for supplying DC power to each of the disk units via main power supply wirings, and a redundant power supply apparatus for generating, with any one of the disk units among the plurality of disk units as a load, DC power to the load. As auxiliary power supply wirings for guiding the output of the redundant power supply apparatus to each of the disk units, a common power supply wiring that is common to each of the power supply apparatuses, a plurality of branch power supply wirings branching from the common power supply wiring and connected to each of the disk units, and a redundant power supply wiring for connecting the redundant power supply apparatus and the common power supply wiring are wired to a backboard.

10 Claims, 7 Drawing Sheets

U.S. PATENT DOCUMENTS

| | | | |
|---|---|---|---|
| 6,597,073 B1* | 7/2003 | Check | 307/64 |
| 6,947,864 B2* | 9/2005 | Garnett | 702/118 |
| 7,051,233 B2* | 5/2006 | Fukumori et al. | 714/14 |
| 7,096,372 B2* | 8/2006 | Sone | 713/300 |
| 7,167,359 B2* | 1/2007 | Wendel et al. | 361/679.36 |
| 7,170,194 B2* | 1/2007 | Korcharz et al. | 307/21 |
| 7,243,248 B1* | 7/2007 | Roux et al. | 713/300 |
| 7,257,722 B2* | 8/2007 | Sone | 713/300 |
| 7,278,037 B2* | 10/2007 | Sone | 713/300 |
| 7,279,810 B2* | 10/2007 | Nitta | 307/64 |
| 7,296,166 B2* | 11/2007 | Sakakibara et al. | 713/300 |
| 7,406,623 B2* | 7/2008 | Takahashi et al. | 714/14 |
| 7,423,354 B2* | 9/2008 | Suzuki et al. | 307/28 |
| 7,441,130 B2* | 10/2008 | Isobe et al. | 713/300 |
| 7,449,797 B2* | 11/2008 | Takahashi | 307/52 |
| 7,464,292 B2* | 12/2008 | Zansky et al. | 714/14 |
| 7,490,252 B2* | 2/2009 | Tsai | 713/300 |
| 7,511,911 B2* | 3/2009 | Suzuki et al. | 360/71 |
| 7,548,502 B2* | 6/2009 | Hayashi | 369/53.18 |
| 7,557,461 B2* | 7/2009 | Kawakubo et al. | 307/29 |
| 7,581,137 B2* | 8/2009 | Okada et al. | 714/24 |
| 7,612,467 B2* | 11/2009 | Suzuki et al. | 307/64 |
| 7,664,974 B2* | 2/2010 | Sone | 713/300 |
| 7,669,066 B2* | 2/2010 | Sakakibara et al. | 713/300 |
| 7,671,485 B2* | 3/2010 | Suzuki et al. | 307/28 |
| 7,698,595 B2* | 4/2010 | Inoue et al. | 714/14 |
| 7,788,531 B2* | 8/2010 | Adams | 714/14 |
| 7,809,983 B2* | 10/2010 | Suzuki et al. | 714/14 |
| 7,831,860 B2* | 11/2010 | Hsieh et al. | 714/14 |
| 7,840,840 B2* | 11/2010 | Takahashi et al. | 714/14 |
| 2005/0114715 A1* | 5/2005 | Sone | 713/300 |
| 2006/0262657 A1 | 11/2006 | Sueyhoski | |
| 2006/0291085 A1 | 12/2006 | Suzuki et al. | |

FOREIGN PATENT DOCUMENTS

| | | |
|---|---|---|
| JP | H02-214421 | 8/1990 |
| JP | 2007-036575 | 2/1995 |
| JP | H07-036575 | 2/1995 |
| JP | 2005-173941 | 12/2003 |
| JP | 2006-323574 | 11/2006 |

OTHER PUBLICATIONS

Hewlett Packard. HP 600 Modular Disk System. Feb. 13, 2012.*
Oracle. Oracle's Sun Fire X4170 M2 and Sun Fire X4270 M2 Server Architecture. White Paper. Jan. 2011.*
Cisco. High-Availability Storage Networks with Cisco MDS 9500 Series Multilayer Directors. White Paper. 2011.*

* cited by examiner

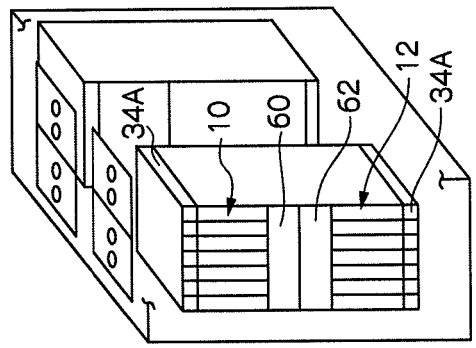
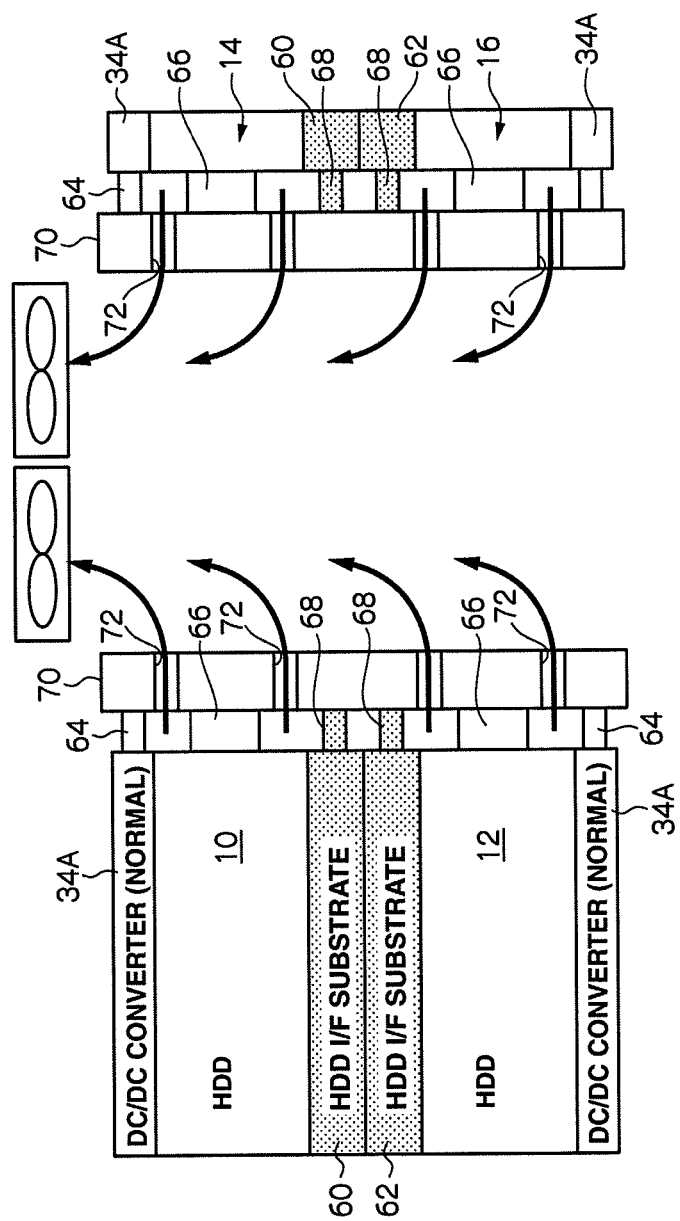

STORAGE SUBSYSTEM AND POWER SUPPLY SYSTEM

CROSS REFERENCE TO RELATED APPLICATION(S)

This application is a continuation of U.S. patent application Ser. No. 12/010,688, filed Jan. 29, 2008, which claims the benefit of Japanese Patent Application No. 2007-192479, filed on Jul. 24, 2007, each of which is incorporated by reference as if fully set forth herein.

BACKGROUND

The present invention relates to a power supply system for supplying power to a storage medium housed in a storage apparatus, and to a storage subsystem redundantly configuring this power supply system.

In recent years, pursuant to the development of information society, a disk subsystem (or a storage subsystem) including magnetic disk apparatuses as storage apparatuses is demanded of greater capacity and greater number of mounted disks year by year. Meanwhile, the apparatuses configuring the disk subsystem are demanded of miniaturization, price-reduction, as well as further reliability regarding the steady supply of power or reliable protection of data. Thus, these apparatuses are demanded of the following configurations: (1) In order to more reliably store data in hard disks, to increase the number of mounted hard disks to be housed in the disk subsystem, and to also increase the number of hard disks to be connected to the same motherboard and power supply; (2) In order for the apparatuses configuring the disk subsystem to operate normally even during the occurrence of a failure in the power supply, to connect the power supply and power supply capable that supply power to the apparatuses in a duplicated or redundant configuration; and (3) In order to realize nondisruptive maintenance, when a failure occurs in a power supply while the apparatuses are operating, to provide a detection/reporting circuit or the like for detecting and reporting such failure inside the apparatuses.

As magnetic disk apparatuses comprising a system unit for increasing the reliability of the power supply, conventionally, a disk subsystem configured from a hard disk control logical unit and a disk unit has been proposed. This disk subsystem is configured so as to supply power to the hard disks using two or more power supplies mounted on a power supply boundary (backboard). Each of the mounted power supplies has sufficient output capacity for driving all hard disks so that the operation of the apparatuses will not be affected even when one power supply malfunctions and the output is stopped. Further, the respective power supplies are configured so that two independent power supply apparatuses can be connected to enable operation to continue even when power supply failure occurs in the power supply apparatus or the like.

When the output volume is stopped due to an internal malfunction of the power supply, the respective power supplies report the malfunction of the power supply to the power supply malfunction detection unit. The power supply voltage to be supplied to the hard disk is checked by the power supply malfunction detection unit. When the voltage falls below the operable voltage of the hard disk, the power supply malfunction detection unit detects a malfunction, and reports the malfunction of the power supply to the hard disk control logical unit.

Also proposed is a disk subsystem adopting a power supply system that supplies power to hard disks from one output configured to supply power individually from two or more power supplies mounted on the apparatus to the backboard, wherein the hard disks have individual power supplies, and the power supplies are input from two or more lines on the backboard (Japanese Patent Laid-Open Publication No. 2005-173941).

SUMMARY

Nevertheless, with the foregoing conventional technology, although a redundant configuration is realized by mounting two power supplies equipped with the same output power supply voltage for each backboard, since the mutual outputs are OR connected on the backboard, both power supplies will malfunction and the system will crash if a short-circuit occurs in the backboard or the hard disk.

In addition, since the hard disk and the power supply are connected one-on-one and configured as a single unit in the disk subsystem, if a failure occurs to either the power supply or the hard disk, it will be necessary to replace both components, and certain components will be wasted. Moreover, since the hard disk and the power supply are connected one-on-one and configured as a single unit, a redundant power supply is not mounted in relation to the power supply, and the apparatus will not be able to operate when a failure occurs to the power supply in the unit.

In the foregoing case, although it would be possible to adopt a system of providing a redundant power supply in addition to the normal power supply and supplying power from the redundant power supply to the hard disks, if power is simply supplied from the redundant power supply to the hard disks, the number of power supply wirings will increase, and the number of so-called backboard wirings will increase and interfere with the simplification of the configuration.

The present invention was devised in view of the foregoing problems. Thus, an object of this invention is to reduce the number of auxiliary power supply wirings for guiding the output of the redundant power supply to the respective storage apparatuses upon providing a redundant power supply for supplying power to any one of the storage apparatuses in addition to the DC power supply for supplying power to the respective storage apparatuses.

In order to achieve the foregoing object, the present invention provides a storage subsystem connected to a host computer via a communication network. This storage subsystem comprises a plurality of storage apparatuses for storing data from the host computer, a plurality of DC power supplies arranged in correspondence to each of the storage apparatuses, and for supplying DC power to each of the storage apparatuses via a main power supply wiring, a redundant DC power supply for generating, with any one of the storage apparatuses among the plurality of storage apparatus as a load, DC power to the load, and an auxiliary power supply wiring for guiding the output of the redundant DC power supply to each of the storage apparatuses. The auxiliary power supply wiring is configured by partially including a wiring that is common to the respective power supply apparatuses.

According to the foregoing configuration, since the auxiliary power supply wirings will be consolidated, it is possible to reduce the number of auxiliary power supply wirings. Redundancy can be secured with a configuration of 2n power supply apparatuses and one redundant power supply apparatus.

The following elements may be added upon configuring the foregoing storage subsystem. Each of the DC power supplies and the redundant DC power supply may include a malfunction detection circuit for stopping the supply of power to the load upon detecting a malfunction of the load. The auxiliary power supply wiring may include a common power supply wiring that is common to each of the DC power supplies, a plurality of branch power supply wirings branching from the common power supply wiring and connected to another storage apparatus that is different from the load of the respective DC power supplies via each of the DC power supplies, and a redundant power supply wiring for connecting the redundant DC power supply and the common power supply wiring. The auxiliary power supply wiring may be configured by a back-flow prevention diode for preventing the inflow of current from a storage apparatus to become the load to the redundant DC power supply being inserted in correspondence to each of the storage apparatus. Each of the storage apparatuses and each of the power supply apparatuses may be mounted on a backboard by being separated into multiple stages, and an air hole may be formed at a corresponding portion between each of the storage apparatuses or between each of the power supply apparatuses on the backboard. Each of the power supply apparatuses may be arranged by being separated into the upper and lower parts of the backboard, and the auxiliary power supply wiring connecting the redundant power supply apparatus and each of the storage apparatuses may be wired along the edge of the backboard.

According to the foregoing configuration, voltage of the respective storage apparatuses will be lower and it will be possible to prevent the multiple reversals associated with the transfer of power between the power supply apparatus and the redundant power supply apparatus when DC power is supplied from the redundant power supply apparatus to any one of the storage apparatuses in comparison to a case of supplying DC power from the respective power supply apparatuses to the respective storage apparatuses. In addition, as the auxiliary power supply wirings, since the redundant power supply wiring and the respective branch power supply wirings are consolidated in a common power supply wiring that is common to the respective power supply apparatuses, it is possible to reduce the number of layers of the backboard, and reduce the number of backboard wirings. It is also possible to increase the temperature margin since air holes are formed in the backboard in the vicinity of the storage apparatus or the power supply apparatus.

The present invention further provides a power supply system for supplying, with a plurality of storage apparatuses a load, power to each of the storage apparatuses. This power supply system comprises a plurality of DC power supplies arranged in correspondence to each of the storage apparatuses, and for supplying DC power to each of the storage apparatuses via a main power supply wiring, a redundant DC power supply for generating, with any one of the storage apparatuses among the plurality of storage apparatus as a load, DC power to the load, and an auxiliary power supply wiring for guiding the output of the redundant DC power supply to each of the storage apparatuses. The auxiliary power supply wiring is configured by partially including a wiring that is common to the respective power supply apparatuses.

According to the foregoing configuration, since the auxiliary power supply wirings will be consolidated, it is possible to reduce the number of auxiliary power supply wirings. Redundancy can be secured with a configuration of 2n power supply apparatuses and one redundant power supply apparatus. This power supply system is also able to adopt the power supply configuration of the storage subsystem.

According to the present invention, it is possible to reduce the number of auxiliary power supply wirings.

BRIEF DESCRIPTION OF THE DRAWINGS

FIG. 4A is a transverse cross section of the disk unit box, and FIG. 4B is a perspective view of the disk unit box;

DETAILED DESCRIPTION OF THE PREFERRED EMBODIMENTS

Figure 1:
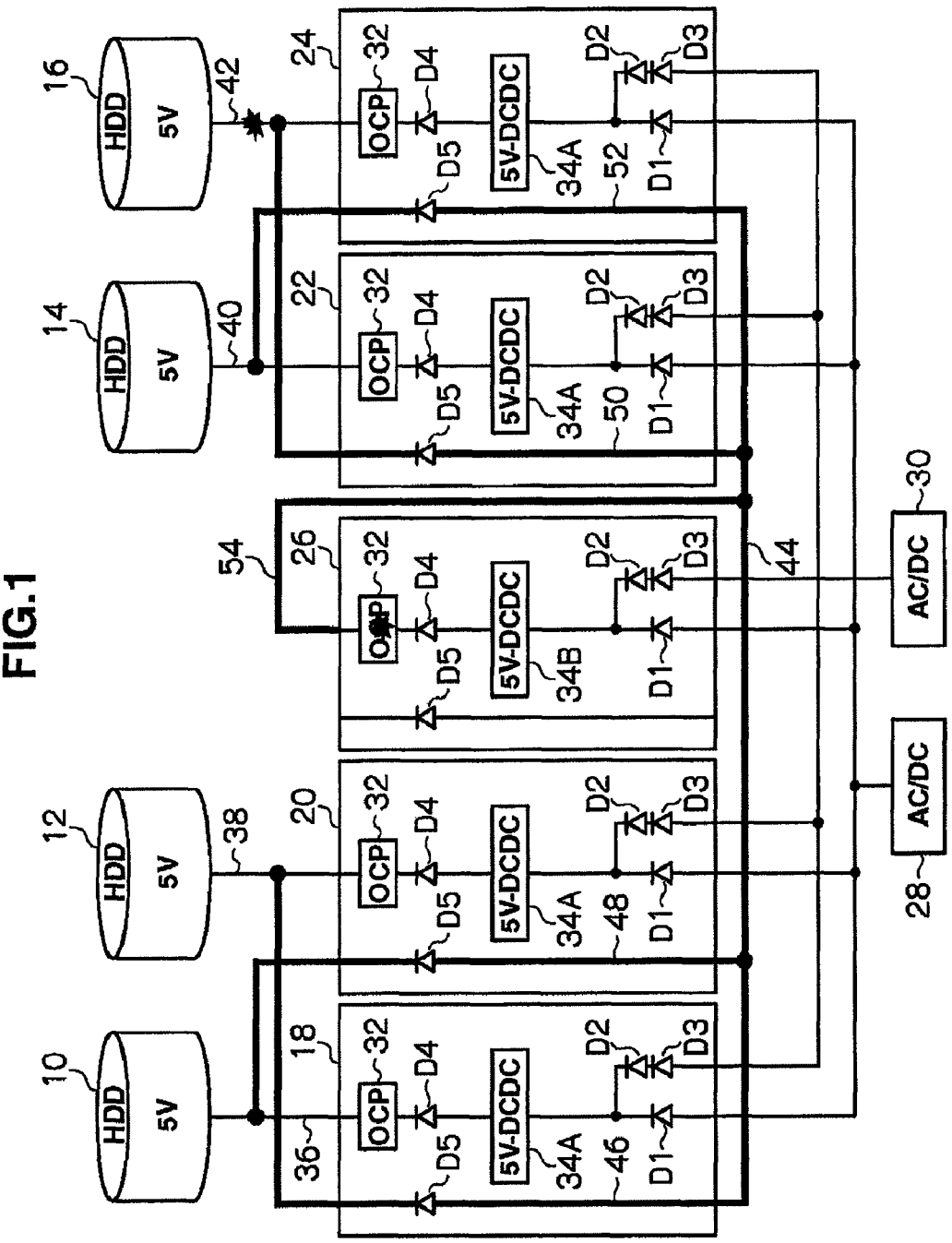
FIG. 1 is a block diagram of a storage apparatus illustrating an embodiment of the present invention.

Embodiments of the present invention are now explained with reference to the attached drawings. FIG. 1 is a block diagram of a storage apparatus pertaining to the first embodiment of the present invention. In FIG. 1, a disk subsystem or a storage subsystem according to this embodiment comprises, as one element of a disk system or a storage system, disk units (HDD units) 10, 12, 14, 16, power supply apparatuses (DC power supplies) 18, 20, 22, 24 arranged in correspondence with each of the disk units and for supplying DC power to each of the disk units 10 to 16, and a redundant power supply apparatus (redundant DC power supply) 26 for generating, with any one of the disk units among the plurality of disk units 10 to 16 as a load, DC power to the foregoing load. The power supply apparatuses 18 to 24 and the redundant power supply apparatus 26 are respectively connected to the AC/DC power supplies 28, 30, and the AC/DC power supplies 28, 30 are respectively connected to the AC power supply (not shown).

Each of the disk units 10 to 16 comprises, as a storage apparatus, a magnetic disk as a storage medium, mechanical components such as a reading/writing read and a power transmission mechanism, electromechanical components such as a motor for driving the foregoing components, and electrical components such as a driver circuit for the electromechanical components, a logical circuit for data processing, and a microprocessor, and these are housed in a single casing. These disk units 10 to 16 store data from the host computer. When configuring each of the disk units 10 to 16 as an element of the disk subsystem or the storage [sub]system, the respective disk units 10 to 16 are connected to a channel adapter (CHA) via a disk adapter (DKA) and a common path, and the channel adapter (CHA) is connected to the host computer via a communication network.

The power supply apparatuses 18 to 24 and the redundant power supply apparatuses 26 are of the same circuit configuration, and comprise, as one element of the power supply system, diodes D1, D2, D3, D4, D5, an overcurrent detection circuit 32, and a DC/DC converter 34A or 34B. With the diode D1, the anode side is connected to an AC/DC power supply 28, and the cathode is connected to the DC/DC converter 34A or 34B. With the diode D3, the anode side is connected to the AC/DC power supply 30, and the cathode side is connected to the DC/DC converter 34A or 34B via the diode D2.

The DC/DC converter 34A or 34B converts the DC voltage from the AC/DC power supply 28 or the AC/DC power supply 30 into 5V DC voltage, and supplies the converted DC voltage to the respective disk units 10 to 16 via the diode D4 and the overcurrent detection circuit 32. The overcurrent detection circuit 32 is configured as a malfunction detection circuit that stops the supply of power to a load when an overcurrent flows from the DC/DC converter 34A or 34B to the respective disk units 10 to 16 upon detecting this as a load malfunction.

Here, the respective power supply apparatuses 18 to 24 and the respective disk units 10 to 16 are connected via the main power supply wirings 36, 38, 40, 42, and DC power is thereby supplied from the respective power supply apparatuses 18 to 24 to the respective disk units 10 to 16. Further, in this embodiment, in order to supply the DC power from the redundant power supply apparatus 26 to the respective disk units 10 to 16, as the auxiliary power supply wirings for guiding the output of the redundant power supply apparatus 26 to the respective disk units 10 to 16, a common power supply wiring 44 that is common to the respective power supply apparatuses, branch power supply wirings 46, 48, 50, 52 branching from the common power supply wiring 44 connected to another disk unit of a different load of the respective power supply apparatuses via the respective power supply apparatuses 18, 20, 22, 24, and a redundant power supply wiring 54 connecting the redundant power supply apparatus 26 and the common power supply wiring 44 are wired via a backboard (not shown). A diode D5 as a back-flow prevention diode for preventing the inflow of current from the respective disk units 10 to 16 to the redundant power supply apparatus 26 is inserted into each of the branch power supply wirings 46 to 52.

Like this, the redundant power supply apparatus 26 is able to supply DC power to the respective disk units 10 to 16 via the redundant power supply wiring 54, the common power supply wiring 44 and the branch power supply wirings 46 to 52. Thus, it is possible to secure redundancy using 2n power supply apparatuses 18 and 20 and 2n power supply apparatuses 22 and 24, and one redundant power supply apparatus 26. Further, since the redundant power supply wiring 54 and the respective branch power supply wirings 46 to 52 are consolidated in the common power supply wiring 44 that is common to the respective party supply apparatuses are the auxiliary power supply wirings, it is possible to reduce the number of layers of the backboard, and reduce the number of disk unit backboard wirings.

Whereas a single diode D4 is inserted in the power supply channel (main power supply wiring) between the DC/DC converter 34A and the respective disk units 10 to 16 of the respective power supply apparatuses 18 to 24, two diodes D4, D5 are connected to the power supply channels (main power supply wiring and auxiliary power supply wiring) between the DC/DC converter 34B and the respective disk units 10 to 16 of the redundant power supply apparatus 26.

In other words, one spare can be realized by redundantly weighing the diodes in two stages. Thus, voltage of the disk units 10 to 16 will be lower and it will be possible to prevent the multiple reversals associated with the transfer of power between the power supply apparatuses 18 to 24 and the redundant power supply apparatus 26 when DC power is supplied from the redundant power supply apparatus 26 to any one of the disk units 10 to 16 in comparison to a case of supplying DC power from the respective power supply apparatuses 18 to 24 to the respective disk units 10 to 16.

Figure 2:
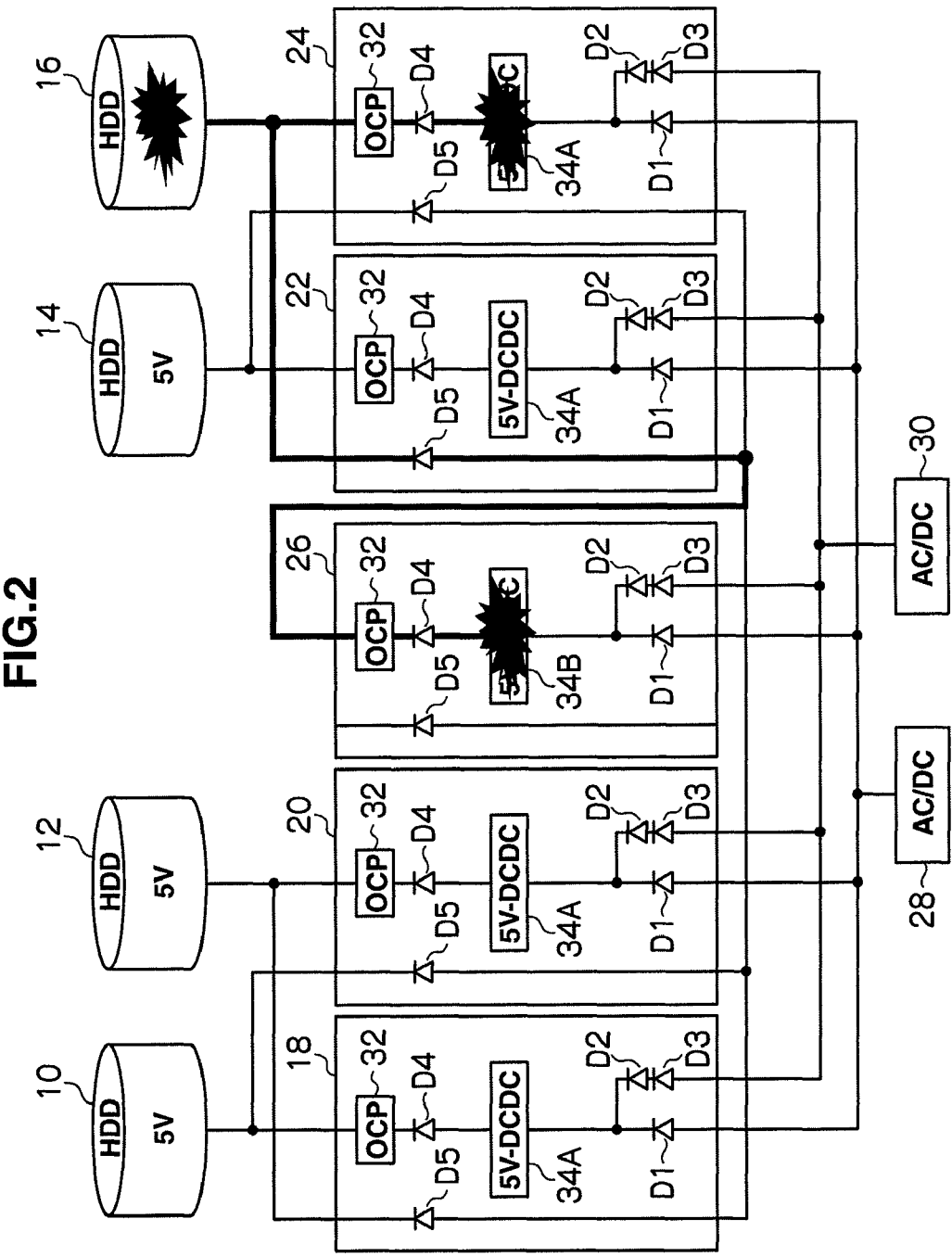
FIG. 2 is a block diagram explaining the operation when a short-circuit failure occurs in the storage apparatus of the present invention.
Figure 3A:
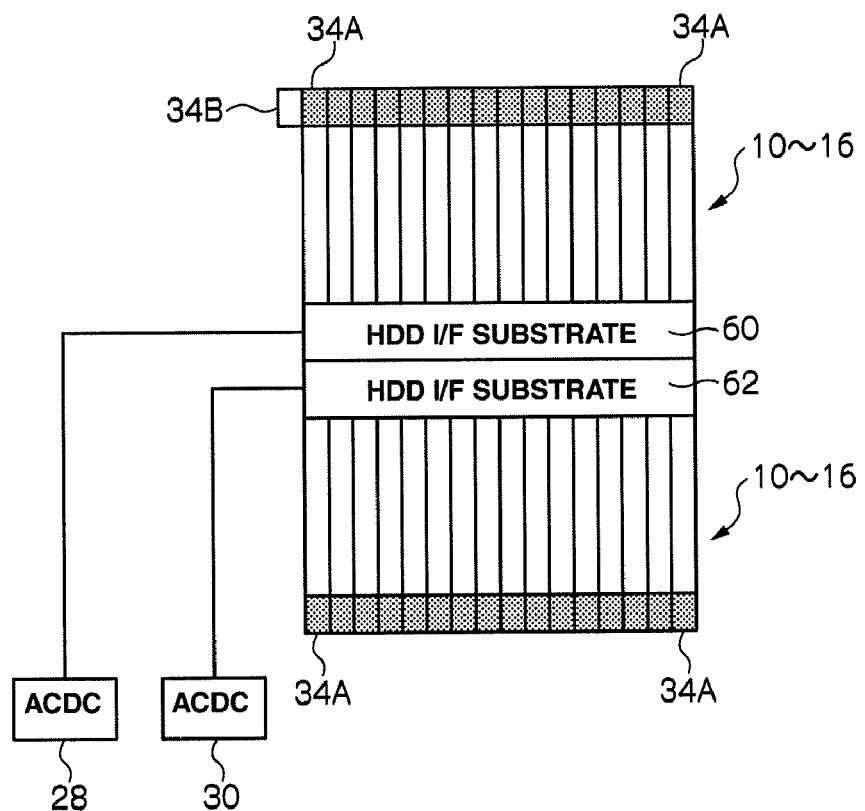
FIG. 3A is a front view of a disk unit box.
Figure 3B:
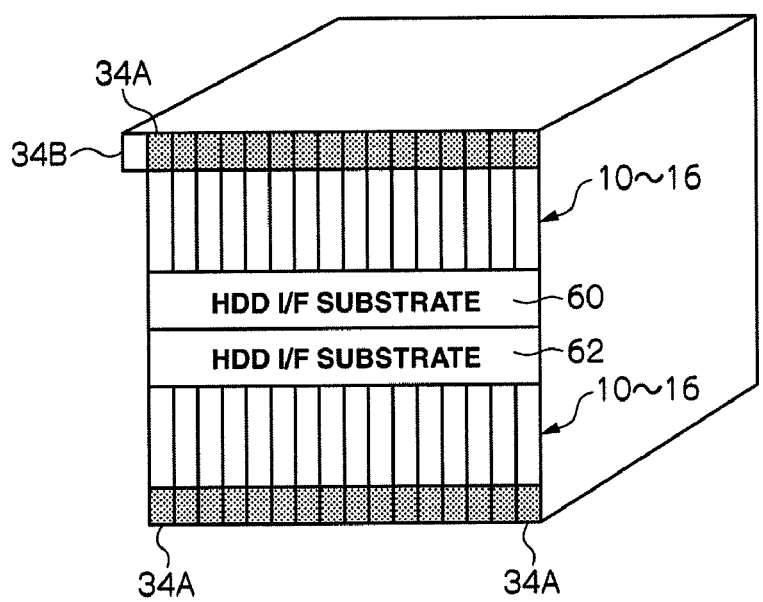
FIG. 3B is a perspective view of the disk unit box.

As shown in FIG. 2, for instance, if a short circuit occurs in the disk unit 16 and the overcurrent detection circuit 32 of the power supply apparatus 24 and the redundant power supply apparatus 26 detects an overcurrent, operation of the DC/DC converter 34A or 34B of the power supply apparatus 24 and the redundant power supply apparatus 26 is stopped according to the detection result, and the supply of DC power from the power supply apparatus 24 and the redundant power supply apparatus 26 to the disk unit 16 is stopped.

In other words, by stopping the operation of the DC/DC converter 34A or 34B of the power supply apparatus 24 and the redundant power supply apparatus 26 is stopped during the short circuit failure of one disk unit 16, it is possible to protect the DC/DC converter 34A or 34B of the power supply apparatus 24 and the redundant power supply apparatus 26 during the short circuit of the disk unit 16, and it is also possible to prevent inflicting an adverse effect on the other normal power supply apparatuses. In the foregoing case, the disk unit 16 can be replaced in a state where the operation of the DC/DC converter 34A or 34B is stopped.

Subsequently, when mounting the power supply apparatuses 18 to 24, the redundant power supply apparatus 26 and the disk units 10 to 16 on a backboard, as shown in FIGS. 3A and 3B and FIGS. 4A and 4B, the DC/DC converter 34A of the power supply apparatuses 18 to 24 is each arranged at the upper side and lower side of the backboard 70 with the disk unit interface (HDD I/F) substrates 60, 62 in the middle, the disk unit 10 or the disk unit 14 is arranged between the DC/DC converter 34A and the disk unit interface substrate 60, and the disk unit 12 or the disk unit 16 is arranged between the disk unit interface substrate 62 and the DC/DC converter 34A. The DC/DC converter 34B of the redundant power supply apparatus 26 is arranged adjacent to the DC/DC converter 34A disposed at the upper side of the backboard 70.

Each of the DC/DC converters 34A is mounted at either the upper side or lower side of the backboard 70 via the connector 64, and the disk units 10, 12, 14, 16 are respectively mounted midway of the backboard 70 via the connector 66. The disk unit interface substrates 60, 62 are respectively mounted roughly in the center of the backboard 70 via the connector 68. Air holes 72 corresponding to the respective connector 64, 66, 68 are formed on the respective backboards 70, and heat from the respective DC/DC converters 34A and the respective disk units 10 to 16 is discharged outside from the air holes 72.

In the foregoing configuration, since the DC/DC converter 34A is mounted on the disk units 10 to 16 for power feeding in one converter units, the DC/DC converter 34A and the respective disk units 10 to 16 can be cooled at a natural cooling level. In addition, since the air holes 72 are formed in the vicinity of the DC/DC converter 34A and the respective disk units 10 to 16, it is possible to increase the temperature margin. Further, since the respective DC/DC converters 34A are arranged to be away from each other, the noise emitted from the respective DC/DC converters 34A can be positively alleviated with the cover.

Figure 5A:
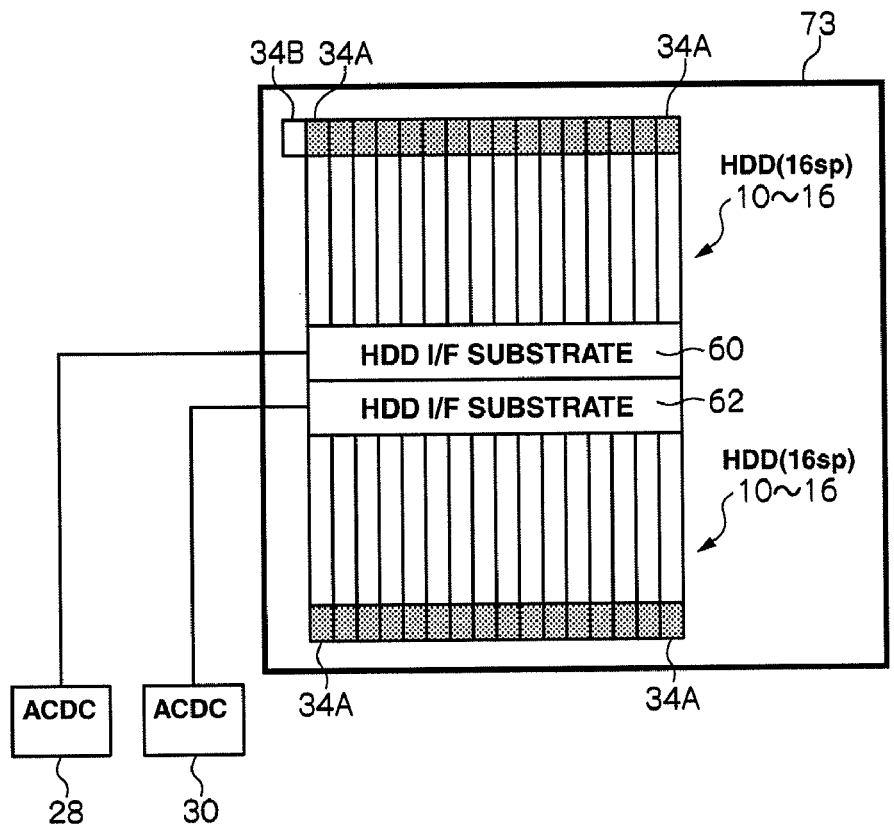
FIG. 5A is a transverse cross section of the disk unit box housed in a case.
Figure 5B:
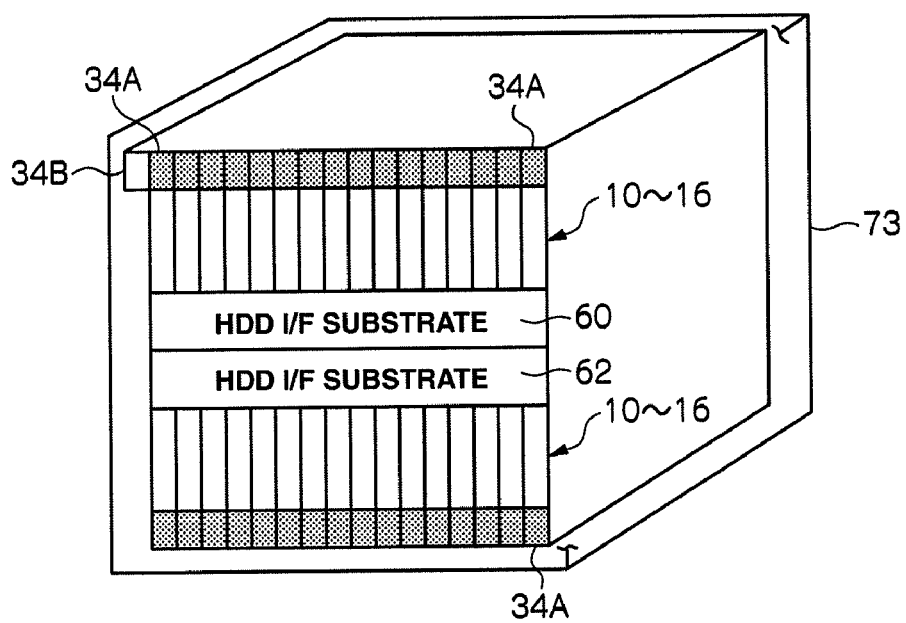
FIG. 5B is a perspective view of the disk unit box housed in the case.

As shown in FIGS. 5A and 5B, upon housing 128 disk units in a case 73, it is also possible to adopt a configuration of providing 32 power supply apparatuses 18 to 24 including the DC/DC converters 34A, providing 4 redundant power supply apparatuses 26 including the DC/DC converters 34B, and supplying DC power from 132 power supply apparatuses 18 to 24 to 128 disk units.

In the foregoing configuration, if the DC/DC converters are to be connected in complete duplication in relation to the 128 disk units, a total of 256 DC/DC converters will be required.

Further, if DC/DC converter is to be connected as one spare to the 128 disk units, a total of 18 DC/DC converters will be required. In this case, to realize the equivalent of the former, 18×8=144 converters will be required. In a configuration of providing 144 to 265 DC/DC converters in relation to 128 disk units, the failure rate will increase. Contrarily, by using 132 DC power supplies including the power supply apparatuses 18 to 24 and the redundant power supply 26 pertaining to the present invention, it is possible to lower the failure rate.

Figure 6:
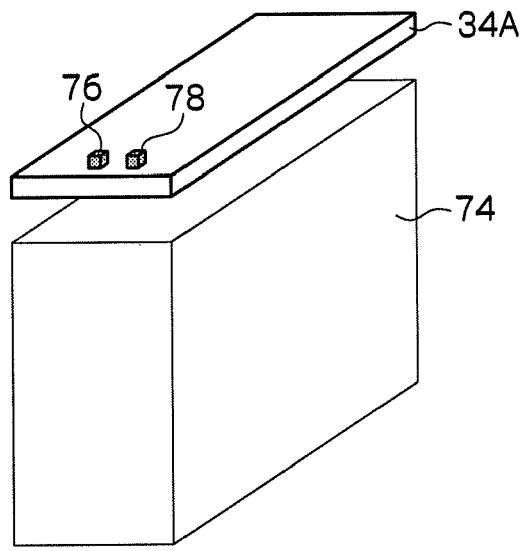
FIG. 6 is a perspective view explaining the arrangement of a DC/DC converter.

Upon mounting the DC/DC converter 34A, as shown in FIG. 6, the DC/DC converter 34A can be mounted without being shielded with a shield by mounting the DC/DC converter 34A at even intervals on the disk unit (HDD) canister assembly 74. In this case, as a result of the DC/DC converter 34A comprising a red light-emitting diode (LED) 76 that flashes during a malfunction or during replacement and a green light-emitting diode (LED) 78 that flashes during normal operation, the flashing of the light-emitting diodes 76, 78 can be confirmed more reliably.

Figure 7:
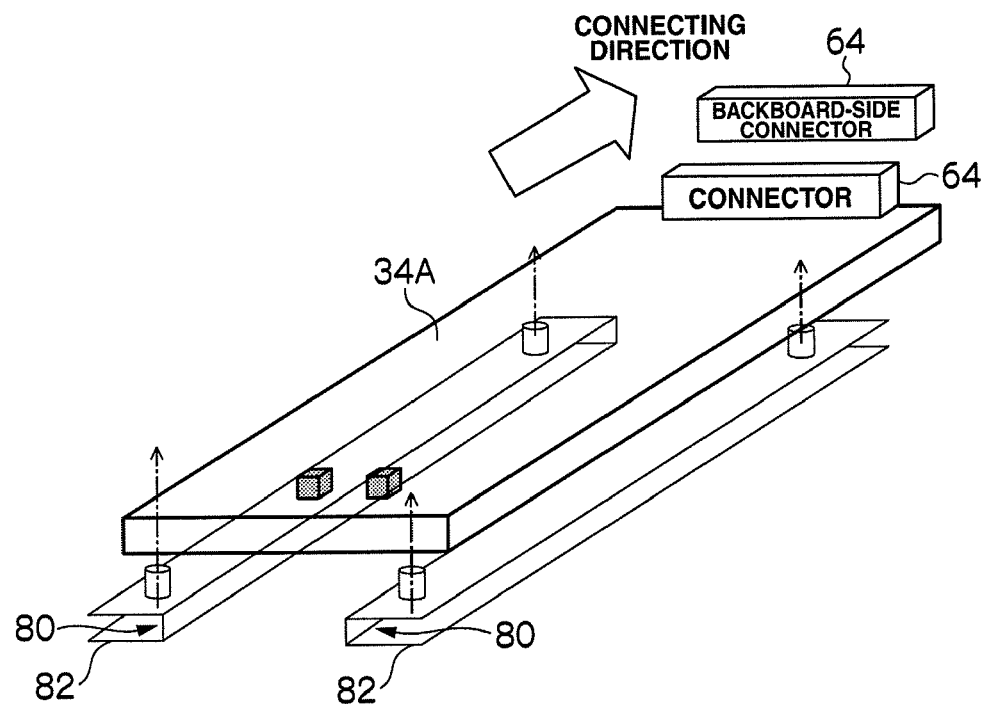
FIG. 7 is a perspective view explaining the method of fixing the DC/DC converter.

In the foregoing configuration, as shown in FIG. 7, the DC/DC converter 34A may be connected to the backboard 70 with an apparatus-side steel plate 80, or connected to the backboard 70 with an apparatus-side steel plate 82. In this case, since the connector 64 is not of a high pin count, either of the foregoing connections may be selected upon connecting the DC/DC converter 34A to the backboard 70, and the insertion and removal is thereby facilitated.

Figure 8A:
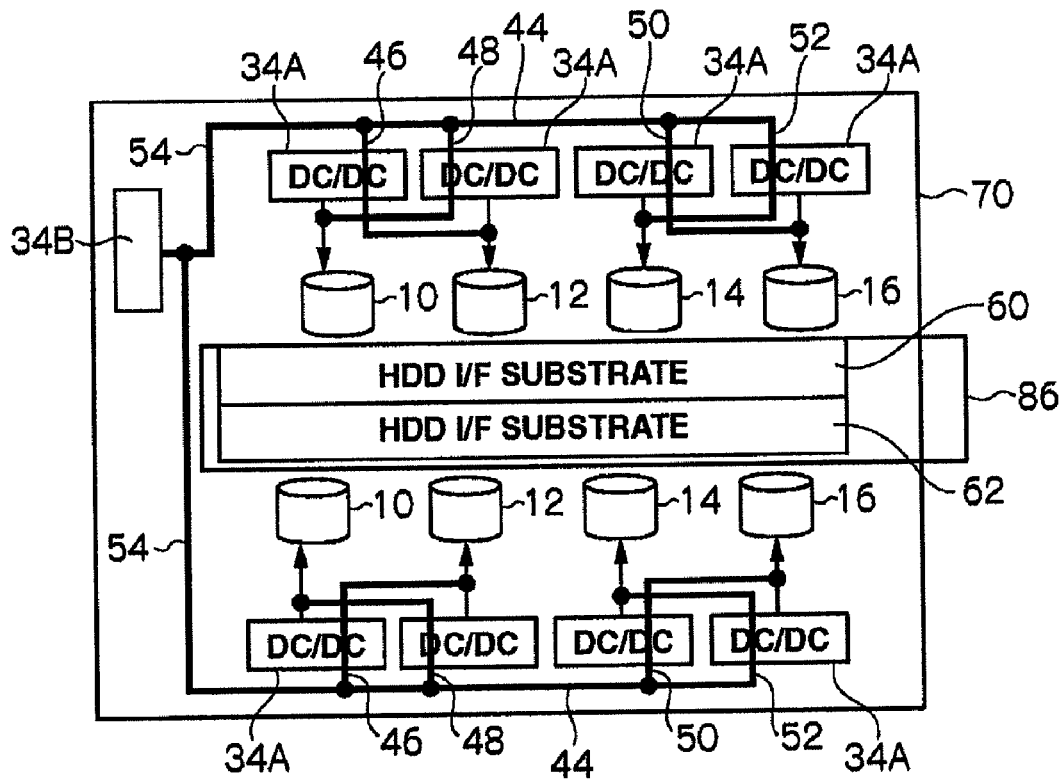
FIG. 8A is a cross section of a backboard mounted on a storage apparatus.

Another embodiment of the present invention is now explained with reference to FIGS. 8A and 8B. Upon mounting the DC/DC converters 34A, 34B and the like on the backboard 70, as shown in FIG. 8A, the disk unit interface substrates 60, 62 are arranged in the center area of the backboard 70, the disk units 10 to 16 are respectively arranged at the upper and lower parts of the disk unit interface substrates 60, 62, the DC/DC converters 34A of the power supply apparatuses 18 to 24 are arranged along the edge of the backboard 70 in correspondence with the respective disk units 10 to 16, the DC/DC converter 34B of the redundant power supply apparatus 26 is arranged at the corner of the backboard 70, and DC power can thereby be supplied from the DC/DC converter 34B of the redundant power supply apparatus 26 to the respective disk units 10 to 16 via the DC/DC converter 34A of the power supply apparatuses 18 to 24. In the foregoing configuration, two common power supply wirings 44 are wired along the upper and lower edges of the backboard 70, and the redundant power supply wiring 54 and the branch power supply wirings 46 to 52 are connected to the respective common power supply wirings 44.

According to the present embodiment, since the disk unit interface substrates 60, 62 are arranged in the center area of the backboard 70, the DC/DC converters 34A of the power supply apparatuses 18 to 24 are arranged along the upper and lower edges of the backboard 70, and the DC/DC converter 34B of the redundant power supply apparatus 26 is arranged at the corner of the backboard 70, the DC/DC converter 34B of the redundant power supply apparatus 26 is arranged at the corner of the backboard 70, two common power supply wirings 44 are wired along the upper and lower edges of the backboard 70, and the redundant power supply wiring 54 and the branch power supply wirings 46 to 52 are connected to the respective common power supply wirings 44, it is possible to consolidate the power supply wirings in a area where the DC/DC converters 34A are mounted.

In addition, since the signal wirings connected to the disk unit interface substrates 60, 62 are consolidated in the signal wiring area 86, and the auxiliary power supply wirings including the common power supply wiring 44, the redundant power supply wiring 54, and the branch power supply wirings 46 to 52, and the power supply wirings 36 to 42 do not cut across the disk unit interface substrates 60, 62, it is possible to prevent noise from overlapping on the signal line.

Figure 8B:
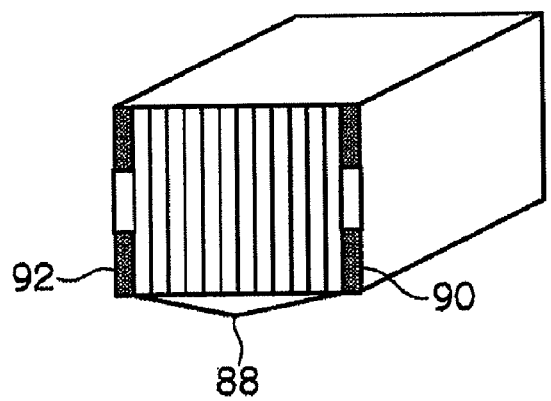
FIG. 8B is a cross section of the relevant parts of the backboard.

Further, as shown in FIG. 8B, it is also possible to reduce the number of layers by forming fibre signal layers 90, 92 on either side of the DC/DC power supply wiring layer 88 of the backboard 70.

What is claimed is:

1. A storage subsystem connected to a host computer via a communication network, said storage subsystem comprising:
    a plurality of storage apparatuses for storing data from said host computer;
    a plurality of DC power supplies, each of which is arranged in correspondence to a respective one of said storage apparatuses and supplies DC power to said one of said storage apparatuses via a respective main power supply wiring;
    a redundant DC power supply for generating, with any one of the storage apparatuses among said plurality of storage apparatus as a load, DC power to said load;
    a backboard with which said plurality of storage apparatuses, said plurality of DC power supplies and said redundant DC power supply are coupled to each other; and
    an auxiliary power supply wiring for guiding the output of said redundant DC power supply to each of said storage apparatuses;
    wherein said auxiliary power supply wiring includes:
        a common power supply wiring that is common to each of said DC power supplies;
        a plurality of branch power supply wirings that branch from said common power supply wiring, wherein, for each of said branch power supply wirings:
            the branch supply wiring is connected to a respective storage apparatus from the storage apparatuses via a respective DC power supply from the plurality of DC power supplies, such that the storage apparatus to which the branch supply wiring is connected is different from the storage apparatus to which the DC power supply supplies DC power; and
        a redundant power supply wiring for connecting said redundant DC power supply and said common power supply wiring.

2. The storage subsystem according to claim 1, wherein each of said DC power supplies and said redundant DC power supply include a malfunction detection circuit for stopping the supply of power to said load upon detecting a malfunction of said load.

3. The storage subsystem according to claim 1, wherein said auxiliary power supply wiring is configured by a backflow prevention diode for preventing the inflow of current from a respective storage apparatus to become the load to said redundant DC power supply being inserted in correspondence to each of said storage apparatuses.

4. The storage subsystem according to claim 1, wherein each of said storage apparatuses and each of said power supplies are mounted on said backboard by being separated into multiple stages, and an air hole is formed at a corresponding portion between each of said storage apparatuses or between each of said power supplies on said backboard.

5. The storage subsystem according to claim 1, wherein each of said power supplies is arranged by being separated into the upper and lower parts of said backboard, and said auxiliary power supply wiring connecting said redundant power supply and each of said storage apparatuses is wired along the edge of said backboard.

6. A power supply system for supplying power to each of a plurality of storage apparatuses, comprising:
- a plurality of DC power supplies, each of which is arranged in correspondence to a respective one of said storage apparatuses and supplies DC power to said one of said storage apparatuses via a respective main power supply wiring;
- a redundant DC power supply for generating, with any one of the storage apparatuses among said plurality of storage apparatus as a load, DC power to said load;
- a backboard with which said plurality of DC power supplies and said redundant DC power supply are coupled to each other; and
- an auxiliary power supply wiring for guiding the output of said redundant DC power supply to each of said storage apparatuses;
- wherein said auxiliary power supply wiring includes:
  - a common power supply wiring that is common to each of said DC power supplies;
  - a plurality of branch power supply wirings that branch from said common power supply wiring, wherein, for each of said branch power supply wirings;
  - the branch supply wiring is connected to a respective storage apparatus from the storage apparatuses via a respective DC power supply from the plurality of DC power supplies, such that the storage apparatus to which the branch supply wiring is connected is different from the storage apparatus to which the DC power supply supplies DC power; and
  - a redundant power supply wiring for connecting said redundant DC power supply and said common power supply wiring.

7. The power supply system according to claim 6, wherein each of said DC power supplies and said redundant DC power supply include a malfunction detection circuit for stopping the supply of power to said load upon detecting a malfunction of said load.

8. The power supply system according to claim 7, wherein said auxiliary power supply wiring is configured by a backflow prevention diode for preventing the inflow of current from a respective storage apparatus to become the load to said redundant DC power supply being inserted in correspondence to each of said storage apparatuses.

9. The power supply system according to claim 7, wherein each of said storage apparatuses and each of said power supplies are mounted on said backboard by being separated into multiple stages, and an air hole is formed at a corresponding portion between each of said storage apparatuses or between each of said power supplies on said backboard.

10. The power supply system according to claim 7, wherein each of said power supplies is arranged by being separated into the upper and lower parts of said backboard, and said auxiliary power supply wiring connecting said redundant power supply and each of said storage apparatuses is wired along the edge of said backboard.

* * * * *